United States Patent

Graf et al.

[11] Patent Number: 6,125,969
[45] Date of Patent: Oct. 3, 2000

[54] METHOD OF AND APPARATUS FOR LUBRICATING AN APPARATUS HAVING A NUMBER OF LUBRICANT LOCATIONS

[75] Inventors: Walter Graf, Euerdorf; Anton May, Burkardroth, both of Germany

[73] Assignee: Perma-Tec GmbH & Co. KG, Euerdorf, Germany

[21] Appl. No.: 09/218,410

[22] Filed: Dec. 22, 1998

[30] Foreign Application Priority Data

Dec. 23, 1997 [DE] Germany ............... 197 57 546
Oct. 12, 1998 [EP] European Pat. Off. ............. 98119208

[51] Int. Cl.[7] ................................................... F01M 11/04
[52] U.S. Cl. ........................... 184/105.1; 184/6.1; 184/26
[58] Field of Search ........................ 184/26, 38.4, 39.1, 184/81, 105.1, 105.2, 108, 6.1, 6.4

[56] References Cited

U.S. PATENT DOCUMENTS

| | | | |
|---|---|---|---|
| 3,856,114 | 12/1974 | Zankl | 184/6.1 |
| 4,527,661 | 7/1985 | Johnstone et al. | 184/6.1 |
| 5,056,623 | 10/1991 | Glasel et al. | 184/7.4 |
| 5,217,662 | 6/1993 | Yamamura et al. | 184/6.1 |
| 5,669,839 | 9/1997 | Graf et al. | 474/91 |
| 5,911,289 | 6/1999 | Waller | 184/6.4 |

FOREIGN PATENT DOCUMENTS

196 27 055  1/1997  Germany.

*Primary Examiner*—David M. Fenstermacher
*Attorney, Agent, or Firm*—Herbert Dubno

[57] ABSTRACT

A plurality of lubricant dispensers with respective microprocessor controllers are connected to a central microcomputer and can count up the number of revolutions of the respective spindle so that local lubrication at different sites of a machine will satisfy the site requirement even if the machine operation and lubrication have been interrupted. The controller of the dispenser includes a data store responsive to the dispensing time which is reset when a new reservoir is hooked up.

14 Claims, 5 Drawing Sheets

METHOD OF AND APPARATUS FOR LUBRICATING AN APPARATUS HAVING A NUMBER OF LUBRICANT LOCATIONS

FIELD OF THE INVENTION

The present invention relates to a method of lubricating a system having a plurality of lubricant locations, generally consisting of at least one apparatus or machine, and to a system for effecting such lubrication under central control. The term "apparatus" as used herein is intended to refer to machines or collections of machine elements, for example, conveyers, chain drives and the like, production equipment having a multiplicity of units, and any arrangement of machine parts, machines or machine components with one drive or a number of drives and which requires lubrication at a plurality of lubrication sites. The term "apparatus" is, therefore, used generically to all such systems and will be used herein interchangeably with "machine" or "system".

BACKGROUND OF THE INVENTION

In German Patent Document DE-A 19627055, a method of lubricating a plurality of lubrication sites or locations is effected by providing individual lubricant dispensers at these sites and equipping each dispenser with an electric motor drive, a controller, a lubricant container holding a supply of the lubricant and a spindle connected to the drive and to the piston so that, upon rotation of the spindle, the piston presses the lubricant out of the dispenser to the site to be lubricated.

The control device can be connected to a central controller and the quantity of lubricant dispensed from the dispenser is thereby controlled by the central unit. The lubricant controller transmits signals to the central unit representing the piston position so that, at the central unit, information as to the state of filling of the lubricant dispenser can be read. The control software required for this purpose can be expensive, complex and difficult to create, especially if a large number of lubricant sites are provided with individual needs as to lubrication and different quantities of lubricant.

The lubricant dispensers can be equipped with motion sensors whose signals are transmitted to the central unit for signal processing there and, upon replacement of a lubricant dispenser, old data must be erased at the central unit and start up data for the new unit must be programmed into the central unit. Since this may result in extensive manual programming, the danger of operator error is relatively high.

The central unit also controls the lubricant dispensers by triggering them at predetermined time intervals. When the entire system operates more or less continuously, this approach affords sufficient accuracy. However, should there be interruptions in operation or continuous operation is not possible, there is a danger that the lubricant will be improperly metered to the particular site since then the lubrication pulses may not be sufficiently synchronized to the actual operating time of the machine to be lubricated.

OBJECTS OF THE INVENTION

It is the principal object of the present invention to provide a method of lubricating an apparatus having multiple lubrication sites under the control of a central unit but in which handling of the lubricant dispensers is simplified, system complexity is reduced and there is improved accommodation of the lubricant needs to the particular lubrication sites.

Another object of the invention is to provide an improved lubrication system which functions more reliably than earlier systems, requires less complex programming and, in general, eliminates drawbacks of earlier systems.

SUMMARY OF THE INVENTION

These objects and others which will become apparent hereinafter are attained, in accordance with the invention by providing at each of the lubricant locations or sites a respective lubricant dispenser having an electric motor drive with a controller, a lubricant reservoir with a supply of the lubricant (e.g. grease), a spindle rotatable by the drive in the housing and a piston coupled with the spindle for being advanced by rotation of the spindle to drive the lubricant out of the housing. The lubricant discharge of each dispenser is effected at dispensing intervals in a time sequence at respective dispensing time points and the dispensing time points are determined by the controller of the lubricant dispenser.

The controllers of all of the dispensers are operatively connected to a central unit and are enabled or placed in operational readiness based upon the status of the apparatus as detected by the central unit. The dispensing time for which the lubricant dispenser is enabled is continuously registered by the controllers of the respective lubricant dispenser and permanently stored so that lubricant release is effected by the controller when the stored dispenser duration reaches a predetermined dispensing time point as determined by the controller.

According to a feature of the invention the central controlled unit integrates the apparatus to be lubricated to determine the operating state thereof, thereby obtaining information such as "machine to be lubricated turned on" or "lubricated machine turned off." It can also monitor the different states of the apparatus to be lubricated, for example, a "high speed" and "low speed" of the machine.

The dispenser time, i.e. the accumulated time for which the dispenser is enabled or inoperational readiness is continuously registered and stored by the controller of each dispenser.

The summed time signal represents information like the time since the last lubrication pulse. It is then possible to obtain a value of the rest period until the triggering of the next lubricant discharge. After an interruption in the operation of the apparatus or machine, the controller reverts back to the stored value and thus triggers the next lubricant impulse after expiration of the rest period in terms of machine operation which should have ensued. Even in cases when a continuous lubrication over a long period of time is not possible, the outputting of the lubrication pulse can be synchronized with the actual operating time of the machine to be lubricated and a lubricant spray can then be fed to the lubricant locations in quantities and at times precisely determined by the machine operation. According to a preferred embodiment of the process of the invention, operating state data of the lubricant dispensers are collected from the controllers thereof and fed to the central control unit. As a consequence, a signal exchange is effected between the central control unit and the controllers in the lubricant dispensers in both directions. The central control unit can integrate the controllers for information like "lubricant dispenser turned on" or "lubricant dispenser turned off". The central control unit can, in addition, generate a corresponding signal as to the degree of filling of the lubricant dispenser and/or signalling the emptying thereof or signals signalling some kind of operational failure.

In a preferred embodiment of the invention, the information is transmitted between the controllers and the central unit in a wireless manner, i.e. the controllers and the central unit may include radio wave receivers and transmitters for this purpose. As a result, the parameter data from the lubricated apparatus and/or the operational data from the lubricant dispensers are transmitted by electromagnetic waves, preferably radio waves. It is also possible, in accordance with the invention to transmit the data by optical signals. Advantageously, the operating state data of the lubricated apparatus and/or the lubricant dispensers can be transmitted by fixed wiring.

For functional control of the lubricant dispensers, different possible scenarios can apply. In a first scenario which is characterized by relatively low cost for control purposes, the lubricant dispensers are supplied with voltage from an external source and the voltage is turned on or turned off from the central station by the central control unit. When the supply voltage to the lubricant dispensers is turned on, the lubricant dispensers are switched into operational readiness, i.e. are enabled. This embodiment has the advantage that the operation of the lubricant dispensers does not depend on the capacities of batteries or accumulators. In one case using an external voltage source, the lubrication discharge and hence the lubricant dispensing time points and lubricant dispensing durations is controlled by the control unit arranged in the lubricant dispenser. The dispenser time points and the duration of the lubricant interval are fixedly predetermined.

Advantageously, the number of spindle revolutions of the electronic motor drive of each lubricant dispenser is directly or indirectly detected by a motion sensor and the sum of the spindle revolutions can be stored permanently in data storage. The summed-up movement signals of the motion sensor supply information as to the setting of the piston or the available lubricant supply. When a predetermined number of spindle rotations has been reached, a signal is transmitted to the central control unit representing an empty state of the dispenser.

In a second embodiment of the invention, the lubricant sensor is supplied with voltage by a voltage source arranged in the lubricant dispenser housing and the voltage supply is activated or deactivated by a signal generated at the central station. The central station unit supplies during the ON time for the controller a signal for the controller which acts as a starting signal for the time measurement. The controller is thus in a stand-by state. As soon as the apparatus to be lubricated is set in operation, the duration of the dispensing time is detected. The lubricant discharge, i.e. the lubricant dispensing time points and dispensing duration, are controlled by the controller of the respective lubricant dispenser. In this embodiment of the invention, signal transmission from the central station or ahead of the central station to the lubricant dispensers can operate wirelessly.

According to the invention, the lubricant dispensers are initially energized by the central control unit to turn them on or activated the voltage supply thereto, thereby enabling the dispensers or placing them in readiness. The further control for the actual dispensing of the lubricant is then taken over by the controllers of the lubricant dispensers themselves. These controllers generate fixed pulse durations for activating the electronic motor drives and after a fixed or preset lubricant dispensing duration, cut off such drives. The controllers thus not only determine the pulsing durations for the lubricant flow but also the lengths of the pauses for which flow is interrupted. Monitoring of the lubricant flow is provided internally within each lubricant dispenser. Preferably, the number of spindle rotations is counted directed or indirectly via a motion sensor. The electronic motor drive of each lubricant dispenser is operated for the interval set in that dispenser and after a predetermined number of turns, as detected, is stopped.

The process of the invention enables in a simple manner flexible and variable lubrication of an apparatus and also allows lubrication at lubrication cites or locations which may be widely spaced from one another. Because of the wireless or hard-wired communication between the central control unit and the multiplicity of lubricant dispensers at respective lubricant locations, a reliable lubricant supply can be insured at minimum cost. With the process of the invention, a large number of lubricant dispensers which are widely removed from one another can be controlled. In the case of a wireless transmission of information, e.g. by radio wave signals, between the central station and the lubricant dispensers, separations of 30 to 50 m can be bridged.

The process of the invention has a special advantage in that the central control unit can facilitate lubrication at different lubrication sites with different lubricants at different lubrication rates and at different times. With a wireless communication between central station and lubricant dispensers, it is especially advantageous that electronic elements can be used which have already been found to be advantageous for central lock systems in motor vehicles, for example. The process can be carried out at minimum cost.

More specifically, the method can comprise the steps of (a) providing at each of the locations a respective lubricant dispenser having an electric motor drive coupled to a spindle, a piston movable by the spindle, a supply of lubricant dispensed by movement of the piston, and an electronic controller for controlling the drive;

(b) actuating each of the dispensers for a sequence of dispensing intervals at dispensing time points determined at least in part by the respective electronic controllers to discharge lubricant at each of the locations;

(c) from a central control unit switching all of the controllers of the dispensers to operational readiness in response to the apparatus to be lubricated;

(d) accumulating a value of operational-readiness time for each of the dispensers with the controller of each dispenser and permanently storing the respective value; and (e) initiating a lubricant discharge by each controller from the respective dispenser when the respective operational-readiness time corresponds to a respective dispensing time point given by the respective controller.

From an apparatus or systems aspect of the invention, a lubrication system can comprise:

at each of the locations a respective lubricant dispenser having an electric motor drive coupled to a spindle, a piston movable by the spindle, a supply of lubricant dispensed by movement of the piston, and an electronic controller for controlling the respective drive, whereby each of the dispensers is actuated for a sequence of dispensing intervals at dispensing time points determined at least in part by the respective electronic controllers to discharge lubricant at each of the locations;

a central control unit operatively coupled to the controllers for switching all of the controllers of the dispensers to operational readiness in response to the apparatus to be lubricated; and means for accumulating a value of operational-readiness time for each of the dispensers in the controller of each dispenser and permanently storing the respective value, and for initiating a lubricant discharge by each controller from the respective dispenser when the respective operational-readiness time corresponds to a respective dispensing time point given by the respective controller.

Advantageously, the central control unit includes a memory-programmable microcomputer, input-signal lines for signals representing an operational state of said apparatus, and outputs operatively connected with said controllers; and each of said controllers includes a microcontroller and a data store with memory contents independent of electric current supply for the respective microcontroller, the memory contents of the respective data store being readable and over-writable so that with data exchange with the data store a respective operational-readiness time is stored therein.

The central lubricating unit according to the invention thus comprises a central unit with a microcomputer and a plurality of lubricant dispensers each with a microprocessor or microprogrammable controller which can be controlled by storage programming control (SPS). The microcontroller of each dispenser can have a data store and the contents of the data store can be stored independently of the current supply to the microcontroller. The data store can be read and overwritten. According to a feature of this aspect of the invention, the data store can be reset by erasure of its contents via a reset switch which can be automatically actuated when a replacement reservoir of the dispenser is attached to the upper part of the housing thereof, the upper part receiving the electric motor drive unit.

The central control unit can be connected to the controllers through an output unit having a voltage processor receiving externally supplied voltage, and a level converter. The central unit can have inputs for sensors measuring parameters of operation of the lubricant dispensers, interfaces for downloading and peripheral devices connectable to the central unit. The central unit can be connected by a bus system with the controllers of the dispensers and each of the dispensers can have a switch settable to select a respective dispensing time interval or settable for the size of the respective lubricant. Each of the controllers can include means for automatically detecting the size of the respective dispenser and for selecting a respected dispensing time interval. Each of the dispensers can be provided with means for signalling a required change of the dispenser when an accumulated sum of signals from a respective motion sensor reaches a predetermined value.

Each lubricant dispenser can have a signalling device for signalling a defect when a frequency of signals generated by a respective motion sensor falls below a predetermined control value during operation of the respective drive or the current draw of the respective drive exceeds a limiting value, and means for generating different optical signals representing motor operation and pauses in operation.

BRIEF DESCRIPTION OF THE DRAWING

The above and other objects, features, and advantages will become more readily apparent from the following description, reference being made to the accompanying drawing in which.

SPECIFIC DESCRIPTION

The method of the invention is used for the lubrication of a multiplicity of lubrication site for an apparatus, machine or other assembly of machine elements. At each of the lubricant locations, a respective lubricant dispenser 1 is provided which is operatively connected with a central unit 5.

Each of the dispensers 2 comprises, at a lower part, a lubricant reservoir 3 and, in an upper part, an electric motor drive 4 (see FIG. 3) the operating state parameters of the machine to be lubricated and the operating state parameters of the lubricant dispensers are supplied to a central computer 5 of the central station 6. Depending upon the data registered by the central computer 5 and evaluated by it, the lubricant dispensers 1 are controlled from the central station. Instead of the central computer 5 or in addition thereto a laptop 7 can be used for acquiring and evaluating the operational state data for control of the lubricant dispenser. It is also within the framework of the invention to use a system programmed control (SPS) at 8.

Figure 1:
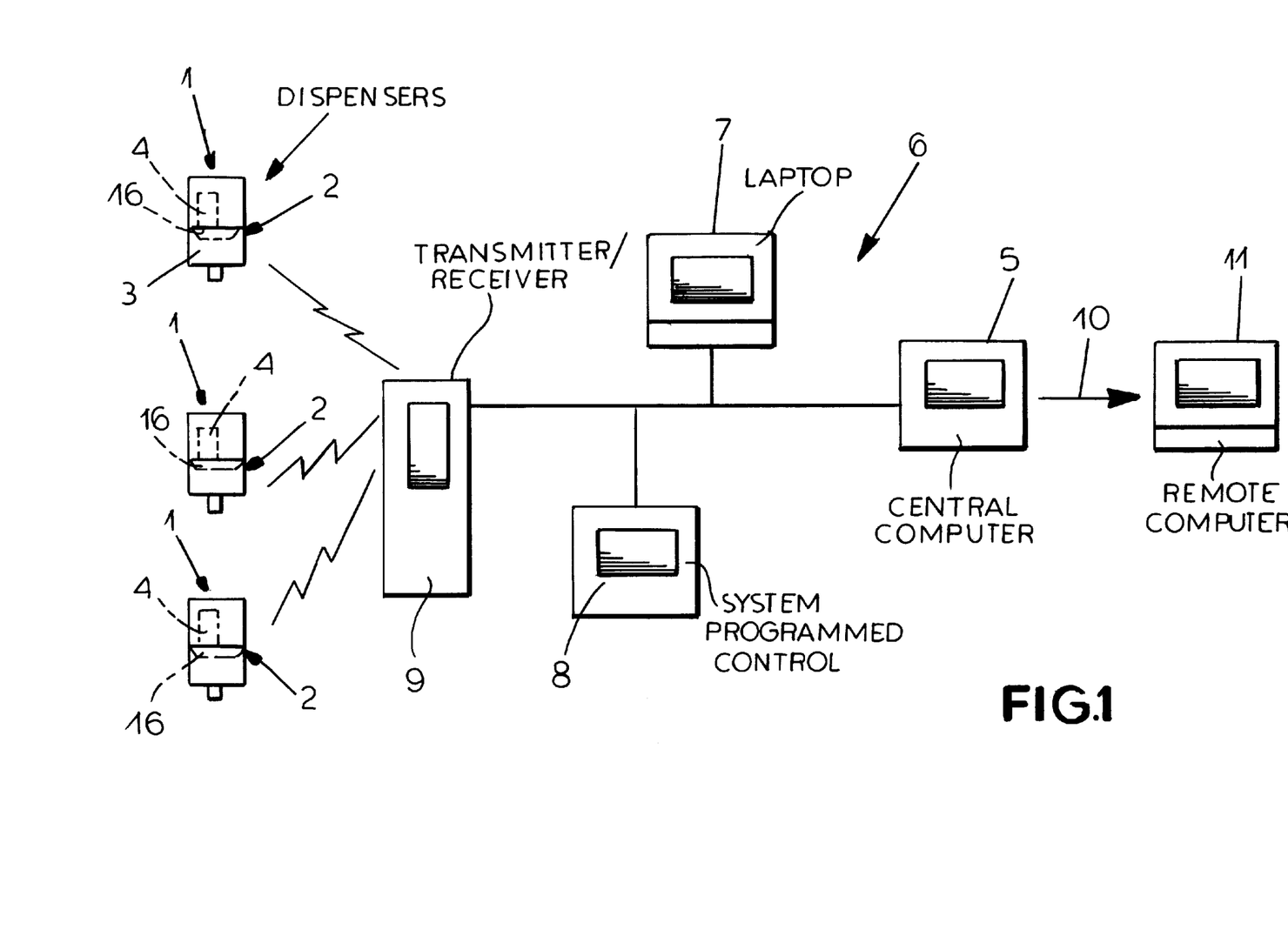
FIG. 1 is a block diagram of a system for practicing the method of the present invention.

In the embodiment of FIG. 1, the communication between the central station 6 and the lubricant dispensers 1 and/or the machine or apparatus, is effected wirelessly, e.g. via radio signals. For this purpose the central station 6 is provided with a transmitter and receiver set 9. The dispensers 1 and/or the machine locations provided with the dispensers can have corresponding transmitter and receiver units.

Figure 2:
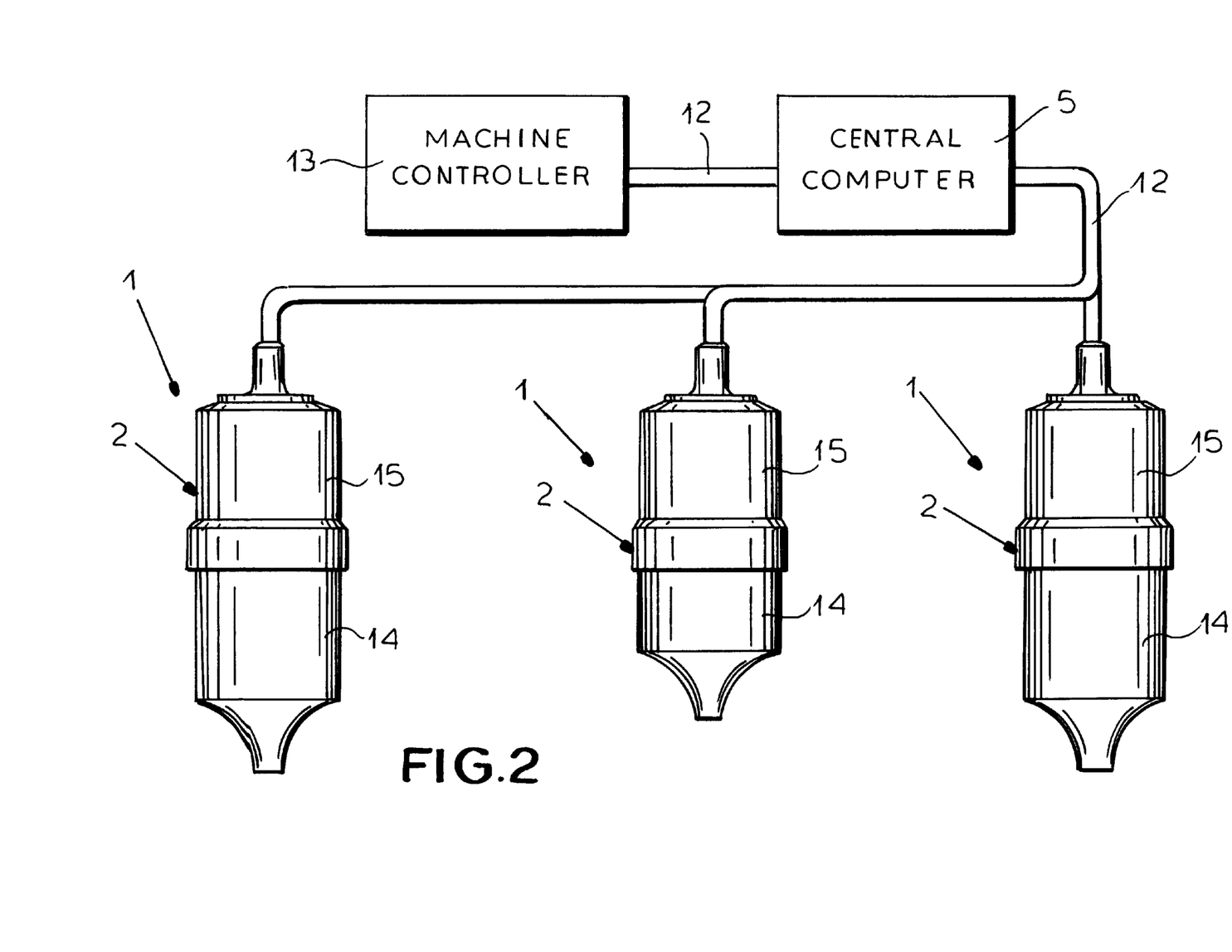
FIG. 2 is a diagram of another embodiment of the system.

In the embodiment shown in FIG. 1, moreover, the arrow 10 represents a data link between the central station or central computer 5 and a network or remote computer represented at 11, in which case the arrow 20 can represent the internet or some other universal link between the remote computer 11 and the central computer 5. The remote computer 11 may be located at a central service facility which may provide planning and maintenance for a number of customers including the customer represented by the central station 6. In the embodiment shown in FIG. 1, the central computer 5 is connected by a bus system 12 with the machine controller 13 of the machine to be lubricated and is also connected by a hard wired system represented by the bus 12 with the controllers of the lubricant dispensers 1. The lubricant dispensers are supplied by external energy sources, e.g. from the central station in the configuration shown in FIG. 2 and it will be apparent also that the dispensers 1 can have different capacity lubricant reservoirs 14 which are dimensional to suit the particular lubrication pattern required at each location.

Figure 3:
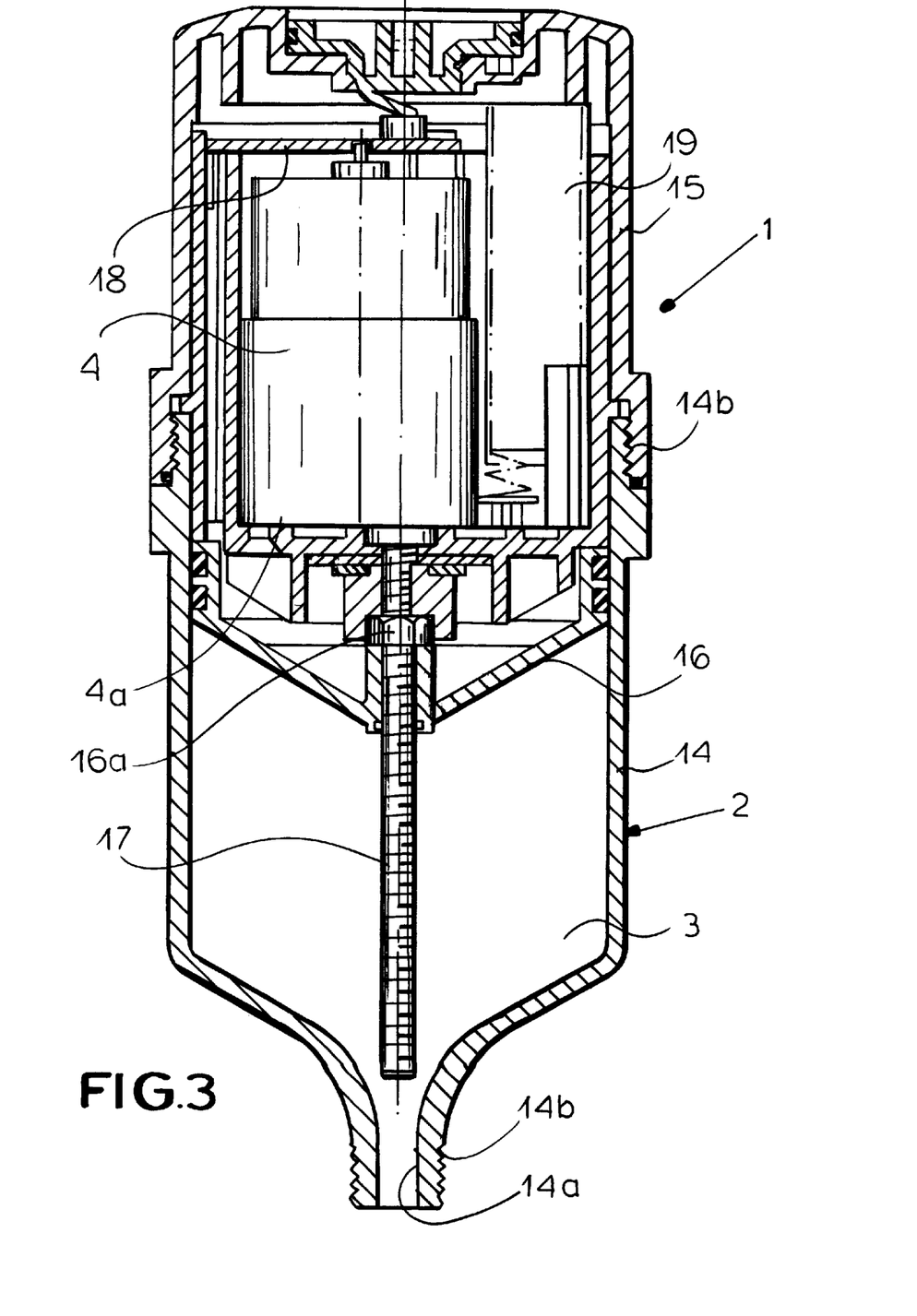
FIG. 3 is an axial section through a lubricant dispenser showing the invention.

In FIG. 3 we have shown a particular configuration of a lubricant dispenser 1 and it will be apparent that other configurations can be used, e.g. that shown in U.S. Pat. No. 5,634,531 for example. It is important that the lubricant dispensers 1 have lubricant reservoirs 14 containing the lubricant 3 which can be expelled through the orifice 14a which can be connected by a screw thread 14b with the machine part to be lubricated. The reservoir 14 is formed as the lower part of the dispenser housing and this lower part is detachably connected by a screw thread 14b with an upper housing part 15. Within the upper housing part 15 there is provided an electric motor drive 4 which has an electric motor 4a whose shaft is formed by a threaded spindle 17 which engages a nut 16a affixed in a piston 16, the latter being displaced downardly in FIG. 3 upon rotation of the spindle 15 to drive the lubricant out of the orifice 14a. The piston 16 is held against rotation in the housing 14, 15.

In the upper part 15 of the housing, above the drive 4, a controller 18 is provided on a printed circuit board and is connected to control the drive 4. The upper part 15 of the housing can also accommodate batteries 19 supplying voltage for the motor 4 or a connection to some external source of electric power.

The lubricant dispenser is additionally described for communication with the central station and central computer 5. The circuit board 18 may, in that case, have contacts or terminals connected by electric lines to a voltage source. The transmitter and receiver devices for wireless communication have not been shown in detail and are mounted on the printed circuitboard 18.

Turning now to the block diagram of FIG. 4 and the controller diagram of FIG. 5, it will be apparent that the central computer 5 can comprise a microprocessor based computer, (hereinafter the microcomputer 20) and a storage programmable control or SPS 21 connected to the microcomputer 20. The central computer 5 is connected for information transfer with the machine controller 22 as represented by the data transfer lines 23 connected to the computer 5. The power connection is represented by the line 23a.

Figure 4:
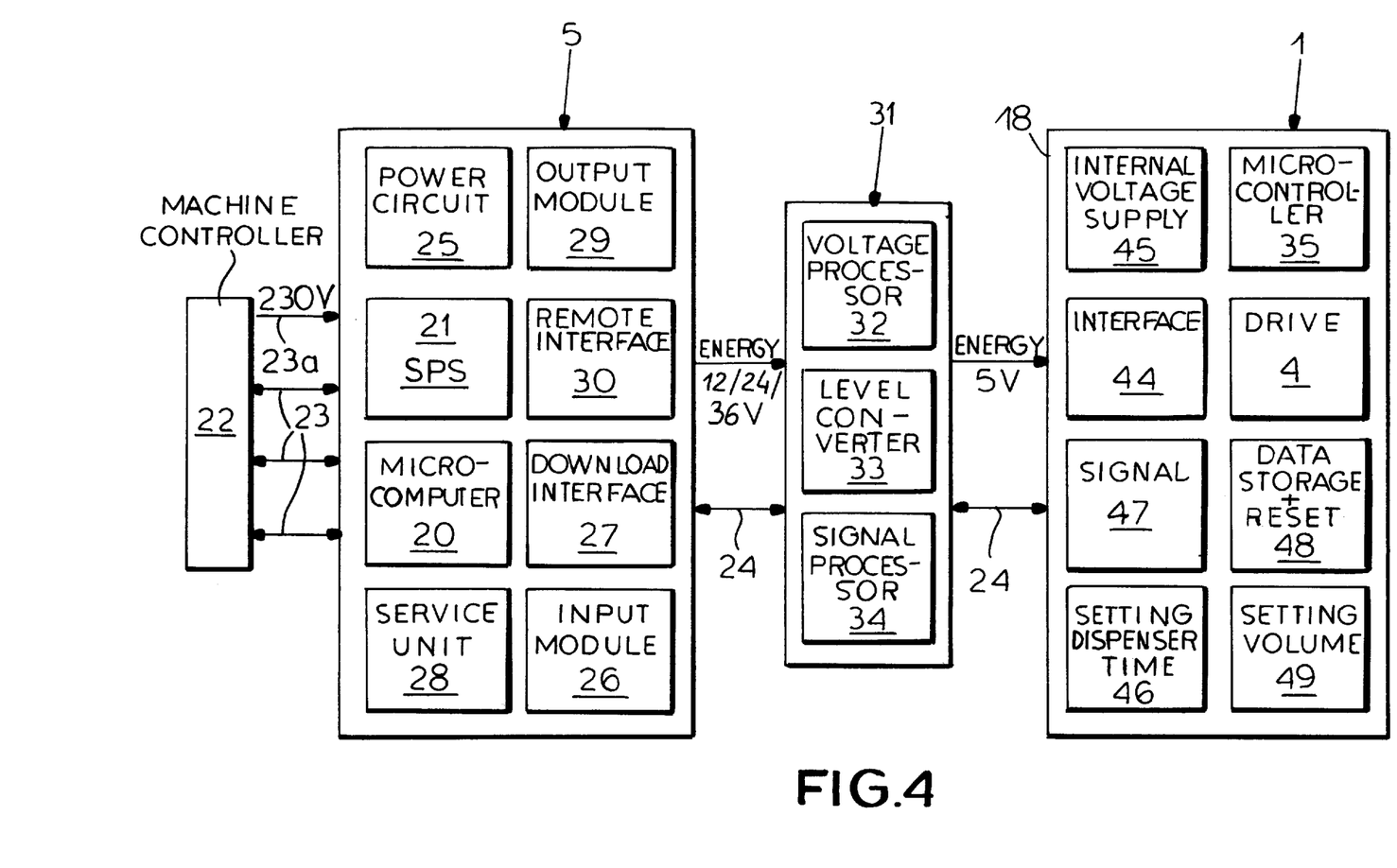
FIG. 4 is a block diagram of a central lubrication system for carrying out the method of the invention.
Figure 5:
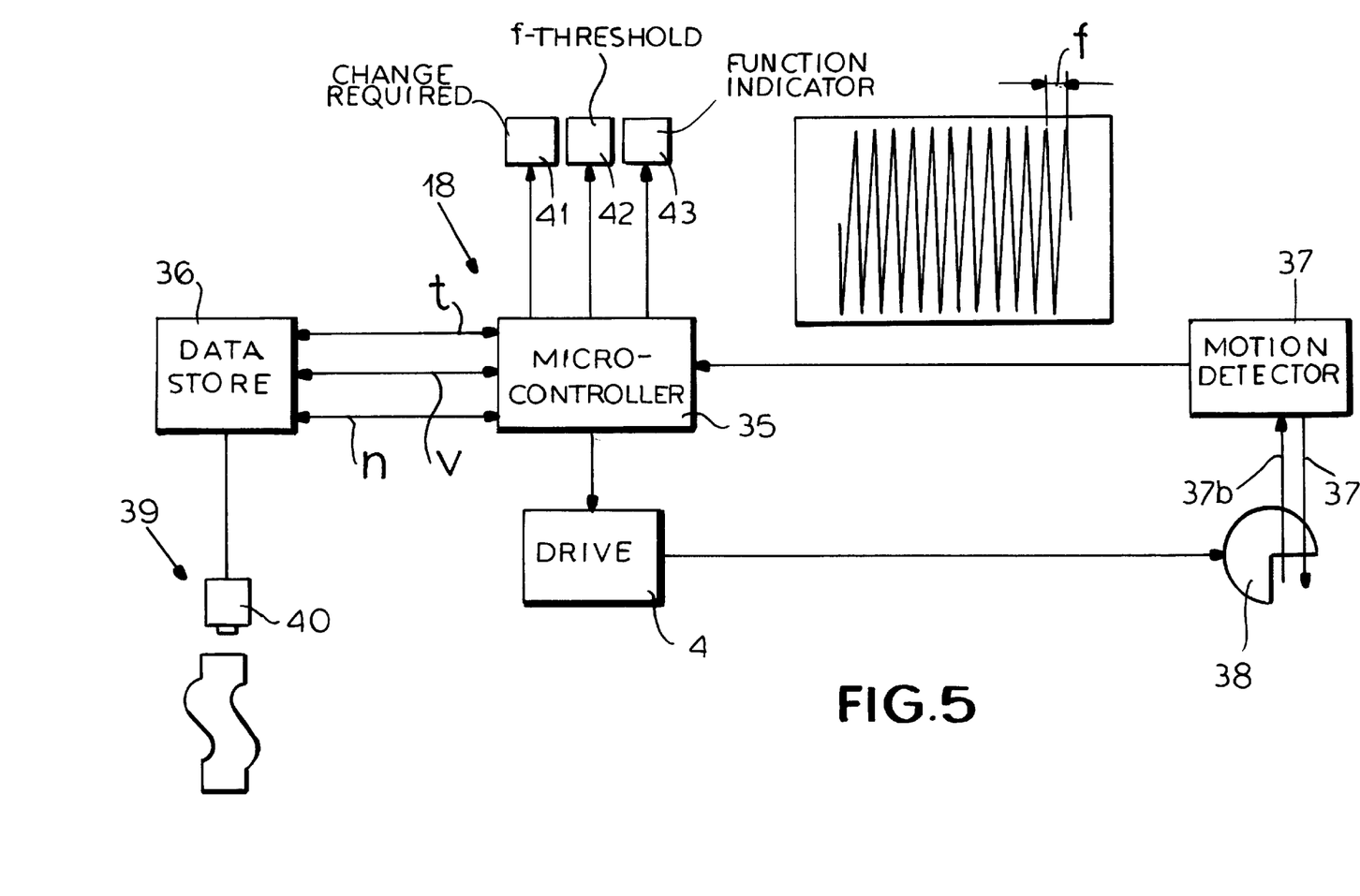
FIG. 5 is a block diagram of a controller for one of the lubricant dispensers.

The central computer 5 also exchanges data with the controller on the printed circuitboard 18 of the lubricant dispenser 1 via the bus system represented by the doubling head arrows 24 in FIG. 4. The block diagram shows that the central computer 5 also includes a power circuit 25, connected with line voltage, for processing the voltage input and producing the supply voltage for the dispensers 1, an input module 26 receiving sensor inputs from the lubricating dispensers, an interface 27 is downloading data and maintenance, a service unit 28 providing for data input and data display, an output module 29 with outputs connected to the bus system 24 previously described and a remote maintenance interface for connection to the internet or the like as has been described previously. The computer 5 may be connected to an input unit 31 generating the signals transmitted to and from the controller 18 of the lubricant dispenser 1. The output device 31 can include, as has been shown in block form in FIG. 4, a voltage processor which can supply the energy required for the printed circuitboard of the microprocessor 1, a level converter 33 and a signal processor 34 for correlating the signals of the main computer and the dispenser 1 with one another.

FIG. 4 also shows in highly diagrammatic form that the printed circuitboard 18 can include the microprocessor or microcontroller 35 which is connected with the drive 4. From FIG. 5 it will be apparent that the microcontroller 35 communicates with the data store 36 and with a motion detector or sensor 37 for the direct or indirect detection of the rotation of the drive shaft.

The motion detector 37 can be provided with a light source represented at 37a and a light detector 37b responsive to rotation of a signal disk 38 so that with each revolution of the disk 38, a pulse is generated by the motion detector 37. The microcontroller 35 is connected by an interface with the motion sensor 37. The data store 36 maintains its memory contents independently of current supply to the microcontroller 35 and is readable and writable. Furthermore, the data store 36 is associated with a circuit 39 having a reset switch 40 which automatically erases the data in the data store 36 when a new reservoir 14 containing lubricant is attached to the respective dispenser. The microcontroller 35 starts the drive 4 upon receipt of control pulses from the central control unit 5 or at intervals preprogrammed in the dispenser controller. The number of pulses generated by the motion sensor 37 is counted by the microcontroller 35 and compared with a set point count. After a predetermined count, the drive 4 is stopped. The microcontroller 35 adds the measured count n of the motion sensor 37 continuously to the count stored in the data store to generate a sum as a new operating value in the data store 36. The elapsed dispensing time t is likewise stored in the data store 36. The lubricant reservoir 14 with the piston 16 and spindle 17 is disposable. When a new reservoir 14 containing a fresh supply 3 of lubricant is attached to the upper part 15 and the spindle 17 is coupled to the drive 4, the reset switch 40 is automatically triggered to erase the previously stored data contents of data store 36. The microcontroller 35 is provided with selector switches for the dispensing time t and/or for the size or volume v of the lubricant reservoir 14. The selector circuit can also set the interval between lubrication pulses and information as to the size v of the lubricant reservoir 14 can be read out from the data store 36.

At interfaces with the microcontroller, signal devices 41 and 42 can be provided, the signal 41 indicating change of reservoir required, based upon a summation of the signals n generated by the motion sensor 37 and a comparison thereof with a preset volume corresponding to the volume of lubricant in the dispenser. The signal 42 displays when the frequency f of the sequence from the motion sensor 37 drops below a threshold or the spacing between two signals exceeds a threshold. A function indicator 43 indicates with different optical signals the onstate of the motor and pauses between motor operations. This allows not only local signalling of the operational state of the lubricant dispenser but permits the signals from the device 41 to 43 to be transmitted via the data communication lines 24 to the central control unit 5. The controller 18 is of modular construction and the basic modules for the lubricant dispenser can include the drive unit 4 with its motion sensor for direct or indirect detection of spindle rotations, and a circuit board with the microcontroller 35 and an interface unit 44 for data communication with the central controller 5. In the embodiment shown in FIG. 4, other units in the dispenser can include an internal voltage supply 45, a unit 46 for setting dispensing time, a unit 47 for signalling the operational state of the dispenser. A data storage unit 48 including the data storage previously described and the circuitry for the reset function and erasure of the contents of the data store and a unit 49 for setting the volume of the lubricant reservoir or a unit is automatic recognition or detection of that volume.

We claim:

1. A central lubrication control system for lubricating at least one apparatus having a plurality of locations to be lubricated, comprising:

at each of said locations a respective lubricant dispenser having an electric motor drive coupled to a spindle, a piston movable by said spindle, a supply of lubricant dispensed by movement of said piston, and an electronic controller for controlling the respective drive, whereby each of said dispensers is actuated for a sequence of dispensing intervals at dispensing time points determined at least in part by the respective electronic controllers to discharge lubricant at each of said locations;

a central control unit operatively coupled to said controllers for switching all of the controllers of said dispensers to operational readiness in response to the apparatus to be lubricated; and means for accumulating a value of operational-readiness time for each of said dispensers in the controller of each dispenser and permanently storing the respective value, and for initiating a lubricant discharge by each controller from the respective dispenser when the respective operational-readiness time corresponds to a respective dispensing time point given by the respective controller.

2. The system defined in claim 1 wherein the central control unit includes a memory-programmable microcomputer, input-signal lines for signals representing an operational state of said apparatus, and outputs operatively connected with said controllers; and each of said controllers includes a microcontroller and a data store with memory contents independent of electric current supply for the respective microcontroller, the memory contents of the respective data store being readable and over-writable so that with data exchange with the data store a respective operational-readiness time is stored therein.

3. The system defined in claim 2 wherein each of said controllers includes a motion sensor for directly or indirectly measuring spindle movement and a sum of all of the rotations of each spindle is stored in the data store of the respective controller.

4. The system defined in claim 3, further comprising circuit means including a reset switch for erasing the memory contents of the respective data stores.

5. The system defined in claim 4 wherein each of said dispensers has a housing, the respective electric motor drive being received in an upper part of the respective housing, the supply of lubricant being received in a lower housing part detachable from said upper part, said reset switch being positioned to be tripped upon attachment of a lower housing part containing a fresh supply of lubricant to the respective upper part.

6. The system defined in claim 2 wherein said central control unit is connected to said controllers through an output unit having a voltage processor receiving externally supplied voltage and a level converter.

7. The system defined in claim 2 wherein said central unit has inputs for sensors measuring parameters of operation of said lubricant dispensers and interfaces for download and peripheral devices connectable to said central unit.

8. The system defined in claim 2 wherein the central control unit is connected by a bus system with the controllers of said dispensers.

9. The system defined in claim 2 wherein each of said dispensers has a selector switch settable for the size of the respective lubricant dispenser.

10. The system defined in claim 2 wherein each of said dispensers has a switch settable to select a respective dispensing time interval.

11. The system defined in claim 2 wherein each of said controllers includes means for automatically detecting the size of the respective dispenser.

12. The system defined in claim 2 wherein each of said dispensers is provided with means for signally a required change of the dispenser when an accumulated sum of signals from a respective motion sensor reaches a predetermined value.

13. The system defined in claim 2 wherein each lubricant dispenser has a signalling device for signalling a defect when a frequency of signals generated by a respective motion sensor falls below a predetermined control value during operation of the respective drive or the current draw of the respective drive exceeds a limiting value, and means for generating different optical signals representing motor operation and pauses in operation.

14. The system defined in claim 2 wherein said control unit and said controllers have wireless transmitters and receivers for wireless communication therebetween.

* * * * *